United States Patent [19]

Walley et al.

[11] 4,158,223
[45] Jun. 12, 1979

[54] LOW LEVEL DIFFUSING REFLECTOR ASSEMBLY

[75] Inventors: Donald P. Walley, Seattle; Buddy J. Hitchcock, Federal Way, both of Wash.

[73] Assignee: Heath Tecna Corporation, Kent, Wash.

[21] Appl. No.: 834,069

[22] Filed: Sep. 16, 1977

[51] Int. Cl.² .............................................. F21V 7/00
[52] U.S. Cl. .................................. 362/297; 362/346; 362/365
[58] Field of Search .................. 362/62, 63, 348, 361, 362/351, 354, 353, 360, 346, 297, 300, 19, 34, 293, 296, 304, 305, 341, 343, 365

[56] References Cited

U.S. PATENT DOCUMENTS

| | | | |
|---|---|---|---|
| 1,138,712 | 5/1915 | Wright | 362/298 |
| 1,295,582 | 2/1919 | Park | 362/296 |
| 1,431,964 | 10/1922 | Lely | 362/307 |
| 1,462,946 | 7/1923 | Stephens | 362/304 |
| 1,718,856 | 6/1929 | Durfee et al. | 362/289 |
| 1,751,934 | 3/1930 | Linton et al. | 362/348 |
| 1,950,083 | 3/1934 | Grant | 240/41.35 |
| 2,058,548 | 10/1936 | Arras | 362/297 |
| 2,257,127 | 9/1941 | Roper et al. | 362/62 |
| 2,308,009 | 1/1943 | Hood et al. | 240/103 |
| 2,935,602 | 5/1960 | Fremont | 362/364 |
| 2,999,924 | 9/1961 | Mottier et al. | 240/41.35 |
| 3,254,207 | 5/1966 | Lowell | 362/320 |
| 3,319,062 | 5/1967 | Falk | 240/103 |
| 3,997,778 | 12/1976 | Fieldstad et al. | 362/346 |

*Primary Examiner*—William M. Shoop
*Assistant Examiner*—Peter S. Wong
*Attorney, Agent, or Firm*—Christensen, O'Connor, Johnson & Kindness

[57] ABSTRACT

A reflector assembly for a low voltage incandescent bulb includes a reflector housing that defines a reflector cavity. A bulb socket holds an incandescent bulb in the cavity so that the bulb filament is positioned wholly within the cavity. The cavity has a glossy white, semireflective surface throughout with the exception of a reflective, mirrored strip having a matte finish that extends from a location inwardly of the bulb filament and adjacent the bulb socket, behind the filament, and down one wall of the cavity to a location adjacent the cavity opening. This reflective structure unexpectedly increases the diffused light output of the assembly by on the order of 40%.

21 Claims, 5 Drawing Figures

LOW LEVEL DIFFUSING REFLECTOR ASSEMBLY

BACKGROUND OF THE INVENTION

The present invention relates to reflector assemblies and, more particularly, to reflector assemblies for use with low voltage emergency lights such as are employed in aircraft.

Commercial aircraft have dual cabin interior lighting systems. A conventional lighting system is powered by the generators driven by the aircraft engines while a back-up emergency lighting system is powered by electrical energy storage devices, such as batteries. The power output of the back-up electrical energy storage systems is substantially less than the power output of the conventional power source for energizing the conventional lighting system. In accordance with current industry standards, a back-up lighting system employing an incandescent bulb is normally required to operate at a relatively low voltage, on the order of $2\frac{1}{2}$ volts, and yet must have a light output over a 40 square inch area at a location 52 inches from the light source of 0.05 foot candles at all locations over the entire 40 square inch area. Light sources that produce a greater illumination than required in the center of the area and a lesser illumination than required toward the periphery of the area are inadequate to meet industry standards and thus unacceptable for the intended purpose.

Prior art reflector assemblies have employed a variety of reflective or semireflective light diffusing coatings in a reflector cavity in which the incandescent light source is housed. For example, one type of reflector cavity coating has a semireflective, glossy white coating throughout the cavity. This coating produces an adequately diffused light over the required 40 square inch area to meet the current industry standards. However, improved light distribution and better illumination from the same power source is always being sought. One attempt to improve the intensity of the illumination over the entire area has been to provide a highly reflective, mirror-like coating over the entire reflective cavity. This highly reflective structure results in a spot lighting effect at the center of the 40 square inch area with reduced illumination at the periphery of the area. Thus, the fully reflectorized cavity does not produced the desired result.

It is therefore a broad object of the present invention to increase the diffused light output otherwise provided by a standard incandescent bulb and power source for use in emergency lighting systems. Further objects of the present invention are to improve the light output of such emergency lighting systems without creating a spotlighting effect, that is, to maintain an evenly diffused light over the entire illuminated area; to retain a standard diffusing lens in a reflector assembly without the necessity for machining or manufacturing a special lens structure; and to increase the output of such lighting systems with little or no modification to the reflector assemblies presently utilized in such lighting systems.

SUMMARY OF THE INVENTION

The foregoing objects, and additional objects that will become apparent to one of ordinary skill in the art upon reading the following specification, are provided in a reflector assembly having a reflector housing that defines a concavely-shaped recess or reflector cavity. A socket means is located in the reflector housing for positioning an incandescent bulb in the recess. The reflector recess has a side wall and a bottom wall adjoining the side wall and an opening through which the light from an incandescent bulb can emanate. The socket means positions the incandescent bulb in the recess so as to locate the bulb filament wholly within the recess and to space the filament from the side wall and the bottom wall. The major portion of the surface area of the reflective cavity is a semireflective, glossy white. The improvement provided by the present invention in the foregoing reflector assembly comprises a mirrored, matte finish, reflective strip positioned on the bottom wall. The reflective strip and the bulb filament are so associated with the cavity as to locate the filament between the reflective strip and the cavity opening. The reflective strip preferably extends from a location adjacent the socket means, past and behind the bulb filament, and down one portion of the side wall of the cavity to a location adjacent the opening. It is required that the strip be as wide or wider than the major dimension of the bulb filament but narrower than the cavity opening. By so constructng the reflector assembly, an even, diffused light output is obtained that is on the order of 40% greater than that obtained when the entire cavity has a glossy white, semireflective surface or when the reflective cavity surface is fully mirrored.

BRIEF DESCRIPTION OF THE DRAWINGS

A better understanding of the present invention can be derived by reading the ensuing specification in conjunction with the accompanying drawings wherein.

DETAILED DESCRIPTION

Figure 1:
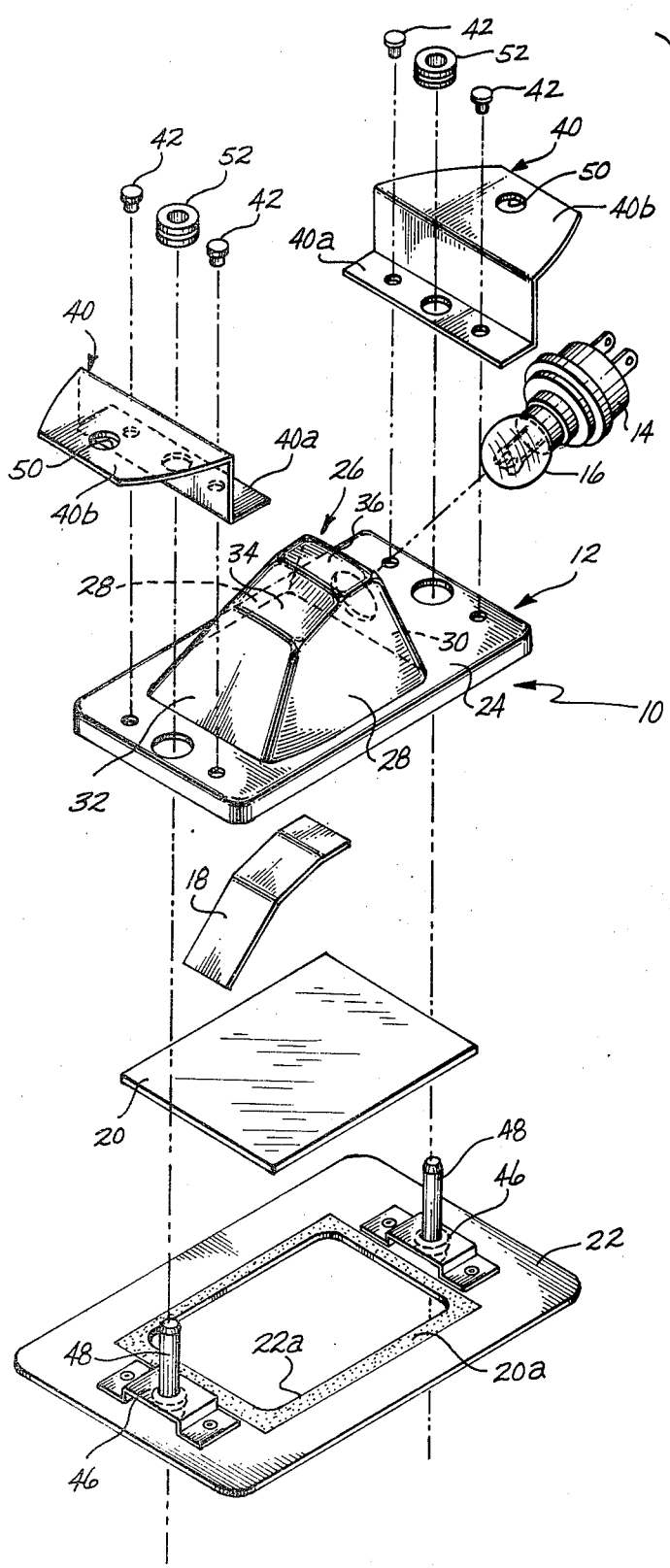
FIG. 1 is an exploded, isometric view of the reflector assembly of the present invention including a matte finish reflective strip that has a mirrored surface coating located in the reflector cavity.
Figure 2:
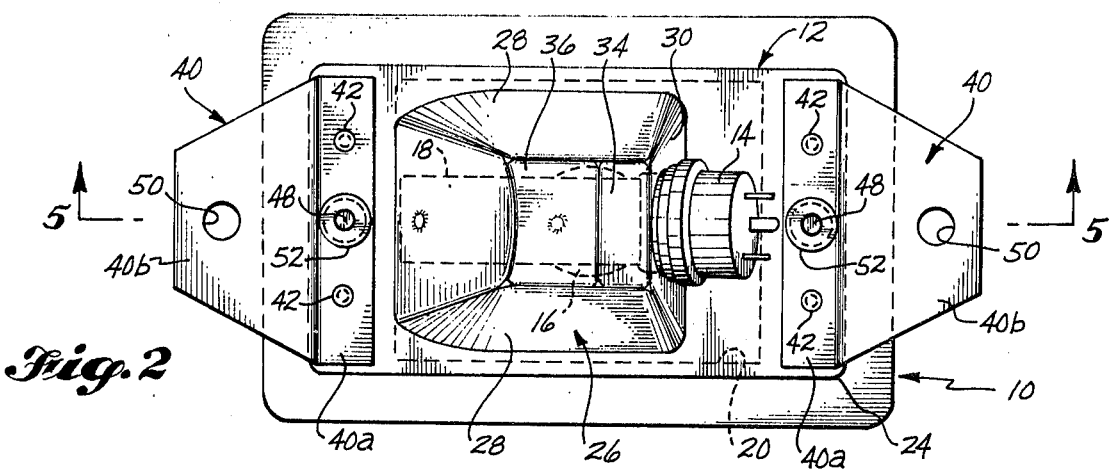
FIG. 2 is a plan view from the rearward side of the reflector assembly of the present invention.
Figure 3:
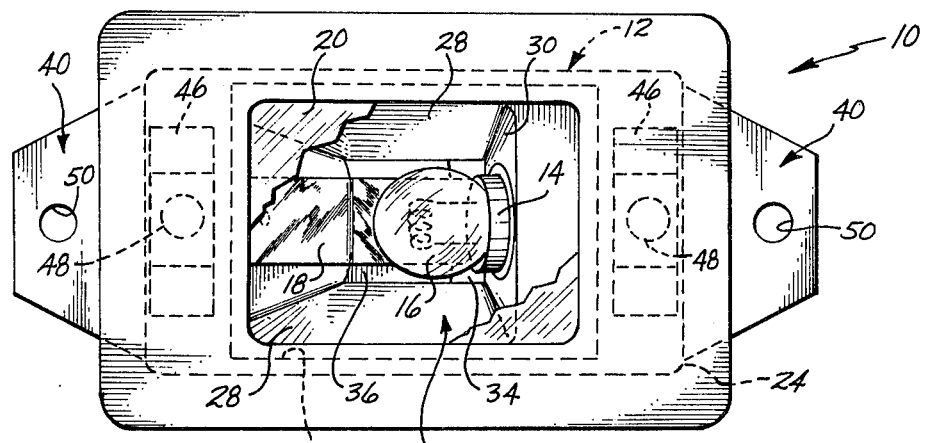
FIG. 3 is a bottom view of the reflector assembly.
Figure 4:
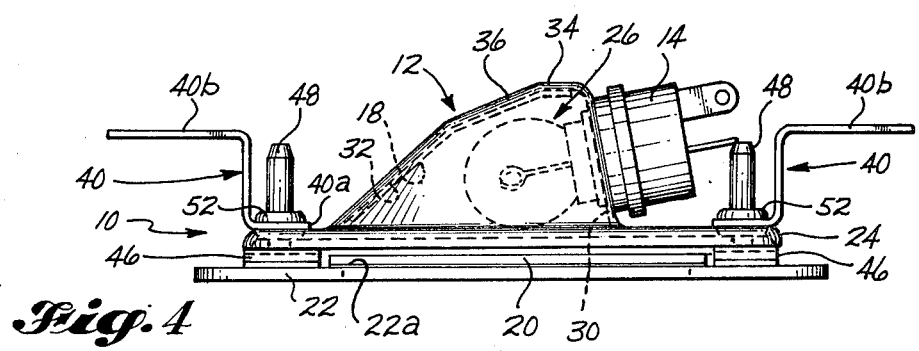
FIG. 4 is a side view of the reflector assembly.
Figure 5:
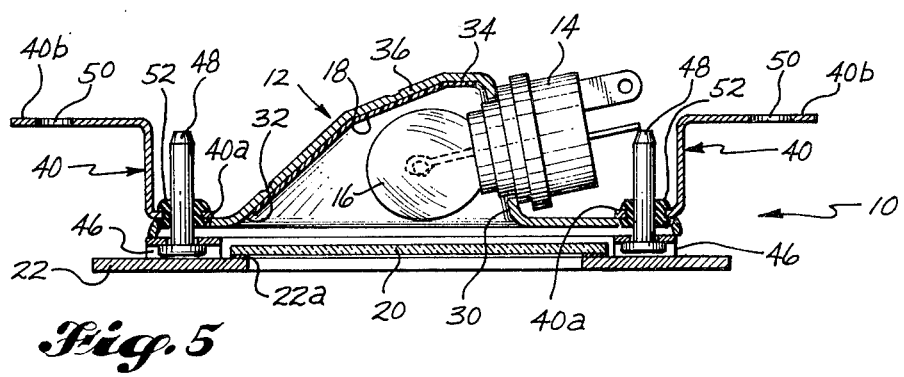
FIG. 5 is a longitudinal sectional view of the reflector assembly taken along section line 5—5 of FIG. 2.

Referring to the drawings, the reflector assembly 10 of the present invention comprises five major components: a reflector housing 12; a bulb socket 14 and bulb 16; a reflective strip 18; a diffusing lens 20; and a lens holder 22. The reflector housing 12 comprises a base plate 24 having relatively flat upper and lower parallel surfaces. The reflector cavity, generally designated 26, is integrally molded with the base plate 24 and includes side walls 28, first and second end walls 30 and 32 and bottom walls 34 and 36. The side, end and bottom walls in FIG. 1 define the concavely shaped reflector cavity 26 that extends inwardly relative to the planar base plate 24 when looking inwardly (or downwardly) into the reflector cavity from the plane of the base plate. For purposes of orientation and terminology, the remainder of the description will be made from the viewpoint looking inwardly into the cavity from the plane of the cavity opening. Each of the walls intersect an adjacent wall or the base plate to form a completely closed cavity wall having an opening situated in the plane of the surface of the base plate. The first end wall 30 contains a circular opening through which the bulb 16 is inserted and into which the bulb socket 14 is mounted. The bulb socket can be fixed permanently to the first end wall 30 or can be removably affixed by conventional means. Relative to the surface plane of the base plate (or of the reflective cavity opening), the first end wall 30 carrying the bulb socket is generally upright, preferably oriented at an angle of from 75° to 85° relative to the plane of the cavity opening. The second end wall 32, on the opposite side of the cavity from the first end wall, is positioned at an angle of from between 35° to 45° with respect to the plane of the cavity opening. The side walls 28 are oriented at an angle of from 60° to 70° relative to the plane of the cavity opening and converge as they extend toward the bottom walls 34 and 36. The first bottom wall 36 adjoining the first end wall 30 is oriented substantially parallel to the plane of the cavity opening, while the second bottom wall 34 slopes outwardly from the first bottom wall toward the second end wall 32 at an angle of from 15° to 25° and intersects the second end wall 32. Both bottom walls are located inwardly from (or below) the bulb 16.

The reflector housing 12 also serves as the main mounting member for the reflector assembly. The reflector housing is mounted to supporting structure in, for example, an airplane by a pair of Z-shaped brackets 40. Rivets 42 fasten the inwardly extending flanges 40a of the brackets 40 to opposing longitudinal ends of the base plate 24. The rivets are of conventional design and are inserted through a pair of mutually aligned holes in the inwardly extending flanges 40a on each of the brackets and in each end of the base plate 24. The Z-shaped brackets 40 have an upright portion and a longitudinally outwardly extending flange portion 40b, each of which carries an aperture 50. Suitable fasteners are inserted through the apertures 50 to fasten the brackets and thus the reflector housing to supporting structure associated with the area to be illuminated.

A lens holder 22 and a planar-planar diffusing lens 20 are also associated with the reflector housing 12. The lens holder 22 comprises a rectangular aluminum plate. A rectangular aperture 22a is located in the central portion of the rectangular lens holder 22. The diffusing lens 20, which has a rectangular configuration and is slightly larger than the aperture 22a, is positioned over the aperture 22a. A conventional adhesive, the location of which is generally designated by the shaded portion 20a on the lens holder 22, is employed between the periphery of the lens and the lens holder to permanently interconnect the two. The lens holder carries a pair of U-shaped brackets 46 with laterally extending flanges that are affixed by spot welding to the flat surface of the lens holder adjacent the longitudinal ends of the holder. The central portion of each of the U-shaped brackets 46 carries the coupling pins 48. The apertures in the U-shaped bracket 46 are spaced so that they are mutually aligned with the corresponding apertures in the reflector housing base plate 24 and in the inwardly extending flanges 40a on the Z-shaped brackets 40. Rubber grommets 52 are positioned in the apertures in the inwardly extending flanges so that when the pins 48 are inserted through the respective apertures in the lens holder and base plate, they are also inserted through the rubber grommets 52. The rubber grommets are sized so as to frictionally retain the pins, thus retaining the lens holder and lens in an integrated assembly with the reflector housing.

Referring now to the construction of the reflector cavity itself, the reflector cavity is defined by the side walls, end walls, and bottom walls and terminates in the reflector cavity opening through which the light produced by the filament of the bulb 16 can emanate. As previously mentioned, the interior surfaces of the lens cavity are a glossy white, semireflective surface. Much of the light incident to the glossy white surface is reflected; however, some is diffused to provide a diffused light pattern that extends through the diffusing lens 20 onto the area to be illuminated. The present invention increases the illumination that is otherwise achievable by means of the glossy white surface by positioning a band or strip 18 having a reflective mirrored surface having a matte finish that extends from the region adjacent the location where the bulb socket extends through the first end wall, across the bottom walls 34 and 36 and down the second end wall 32. The reflective strip 18 terminates just short of the location where the second end wall 32 intersects the base plate 24 of the reflector housing 12. The reflective strip 18 has a width that is slightly less than the width of the bottom walls and the second end wall and that is slightly less than half the width of the reflector cavity opening. The strip is positioned on the bottom walls 34 and 36 and on the second end wall 32 so that the filament of the bulb 16 is intersected by a line perpendicular to the plane of the base plate 24 that extends through a portion of the reflective strip situated on the bottom walls of the cavity. When the strip is thus positioned in the reflector cavity, an increase in even illumination over the aforementioned 40 inch square test area on the order of 40% is achieved without any noticeable spotlighting effect. Further discussion and specific examples of this unexpected result are set forth in the ensuing Examples.

The reflective strip 18 can be integral with the cavity walls or can, as is preferred for the present invention, be composed of a separate chrome plated mylar-vinyl film having a thickness of of the order of 20 mils, coated with a layer of chromium on the order of 2 mils in thickness, and overlaid with a polyester film having a thickness on the order of 2 mils. The chromium is plated on the film so as to provide a matte finish as opposed to highly polished finish. Chrome plated strips of this specification are available under the trade name "Pan-Lam" from Poly Plastics United of Costa Mesa, CA. These chrome plated strips are on the order of 24 mils in total thickness and are easily attached to the polymeric structure of the lens cavity wall by the conventional technique of spot welding, or by other conventional techniques, such as adhesive bonding.

The ensuing Examples are intended to be illustrative of the unexpected results obtained with the reflective strip or band employed in the reflector cavity of the present invention. The Examples are not intended to in any way delimit the scope of the subject matter defined in the appended claims but are presented for the purposes of representing in the specification the unexpected and superior results obtained with the present invention and of teaching one of ordinary skill how to make and use the invention.

EXAMPLE I

A test assembly was constructed by positioning a reflector cavity identical to that disclosed in the foregoing specification but having a glossy white finish throughout the interior of the reflective cavity 52 inches above a test grid. The reflector assembly was provided with an incandescent filament bulb and was supplied with power from a regulated DC power supply supplying 2.50 volts DC to the bulb. The reflector assembly had a cavity opening of about $2\frac{1}{4}$ inches by $1\frac{5}{8}$ inches. The filament of the bulb was positioned approximately ½ inch from the uppermost wall of the reflective cavity and approximately ¾ inch from the lens. Laterally, the filament of the bulb was approximately centered within the cavity. A Weston illumination meter, Model 615, was utilized to measure the light received at the test grid. The test grid was centered under the reflector assembly and was laid out in a square 40 inches on a side. The test grid was divided into 25 equal grid portions each 8 inches on a side. For purposes of recording the information, the grid portions were designated by dividing the grid into columns 1 through 5 and rows A, B, C, D and E. The reflector assembly was oriented so that the lamp holder side of the assembly was extending from the exterior of the cavity in the direction of grid portion 1C (the grid portion identified by column 1, row C). The light received at each of the grid portion locations for Example I is set forth in Table I below.

TABLE I

| | Light Received on Test Grid (Foot/Candle) | | | | |
|---|---|---|---|---|---|
| | Columns | | | | |
| Rows | 1 | 2 | 3 | 4 | 5 |
| A | .21 | .23 | .25 | .24 | .22 |
| B | .25 | .27 | .28 | .28 | .25 |
| C | .26 | .29 | .30 | .30 | .26 |
| D | .26 | .28 | .29 | .28 | .25 |
| E | .22 | .24 | .26 | .25 | .23 |

EXAMPLE II

The test procedure of Example I was repeated except that the entire interior surface of the reflector assembly was provided with a polished, mirror-like covering. The results of the light received at each of the test grid portions are set forth in Table II blow.

TABLE II

| | Light Received on Test Grid (Foot/Candle) | | | | |
|---|---|---|---|---|---|
| | Columns | | | | |
| Rows | 1 | 2 | 3 | 4 | 5 |
| A | .19 | .21 | .21 | .20 | .17 |
| B | .29 | .30 | .28 | .25 | .23 |
| C | .35 | .40 | .37 | .30 | .26 |
| D | .30 | .31 | .29 | .26 | .23 |
| E | .21 | .22 | .23 | .21 | .19 |

EXAMPLE III

The test procedure of Example I was once again repeated utilizing the reflector assembly of the present invention wherein a chrome-plated, matte finish, reflective strip was positioned in a glossy, white reflector, as taught in the foregoing specification. The reflective strip was approximately ½ inch wide and extended from adjacent the lamp holder, behind the bulb filament and terminated adjacent the intersection of the sloping reflector wall (opposite the lamp holder wall) and the base plate. The total length of the reflective strip was approximately 1¾ inches. The test results of the light received at each of the test grid portions are set forth in Table III below.

TABLE III

| | Light Received on Test Grid (Foot/Candle) | | | | |
|---|---|---|---|---|---|
| | Columns | | | | |
| Rows | 1 | 2 | 3 | 4 | 5 |
| A | .29 | .33 | .32 | .28 | .25 |
| B | .35 | .38 | .38 | .31 | .26 |
| C | .38 | .41 | .39 | .34 | .28 |
| D | .36 | .40 | .39 | .34 | .27 |
| E | .31 | .36 | .33 | .31 | .26 |

It is clear from the foregoing Examples that the reflector asembly of the present invention employing the matte finish reflector strip provided an increase in light output at each of the grid locations on the order of 50% more than that provided with the semiglossy, white finish reflector. Moreover, the reflector assembly of the present invention provided a light output adjacent the center portion of the grid very similar to that provided by the mirror-like finish but provided light output toward the periphery of the grid on the order of 50% more than the reflector of Example II employing the mirror-like finish over the entire reflective cavity. The results set forth in Example III were highly unexpected and are substantially better than either of the prior art methods of illuminating a given area with a low voltage incandescent power supply.

Although the present invention has been described in conjunction with a preferred embodiment, it is intended that one of ordinary skill in the art will, after reading the foregoing specification, be able to effect various changes and substitutions of equivalents and will be able to make other alterations without departing from the general scope of the present invention wherein a glossy white reflector cavity is provided with a band of highly reflective mirrored surface that extends behind an incandescent bulb filament to provide a significant increase in diffused and even illumination over the area required to be illuminated. It is therefore intended that the grant of Letters Patent based hereon be limited only by the definition contained in the appended claims and equivalents thereof.

The embodiments of the invention in which an exclusive property or privilege is claimed are defined as follows:

1. In a reflector assembly for low level diffuse illumination includng:
    (a) a reflector housing defining a concavely shaped recess having a side wall and a bottom wall adjoining said side wall, said recess having an opening through which light can emanate, said recess having a semireflective, glossy white surface,
    (b) bulb socket means for positioning an incandescent bulb in said recess so as to locate the filament of said bulb wholly within said recess and spaced from said side wall and said bottom wall,
    the improvement comprising
    (c) a highly reflective strip located adjacent said bottom wall, said strip being positioned so that the filament of said bulb is located between said strip and said opening, said strip extending from a location behind said filament to a location adjacent said opening, said strip being wider than the filament of said bulb and narrower than said opening, said strip in combination with said reflector housing operating to cause light emanated from said reflector assembly to diffusely and substantially uniformly illuminate a predetermined area spaced from said reflector assembly.

2. The assembly of claim 1 wherein said strip comprises a strip of polymeric material having a matte finish, mirrored surface coating, said improvement further comprising means for attaching said polymeric strip to said reflector housing.

3. The assembly of claim 2 wherein said housing comprises a polymeric material and wherein said means for attaching comprises at least one spot weld between said strip and said reflector housing.

4. The assembly of claim 1 wherein said recess is defined by a pair of convergent side walls, a first end wall oriented generally upright relative to the plane of said opening, a second end wall located opposite said first end wall and being oriented at a generally acute angle relative to said opening, said end walls being convergent as they extend away from said opening, and at least one bottom wall adjoining said side and said end walls, said bulb socket means extending through and being affixed to said first end wall.

5. The assembly of claim 4 wherein said strip extends from adjacent said socket means, across said bottom wall, along said second end wall, and terminates adjacent said opening.

6. The assembly of claim 5 wherein the longitudinal edges of said strip are spaced from the junction of said second end wall and said side walls and are spaced from the junction of said bottom wall and said side walls.

7. The assembly of claim 4 wherein said side walls are convergent and are oriented relative to the plane of said opening of an angle of about 60° to about 70°.

8. The assembly of claim 7 wherein said second end wall is oriented at an angle of from about 35° to about 45° relative to the plane of said opening and slants toward said first end wall.

9. The assembly of claim 8 wherein said first end wall is oriented at an angle of about 75° to about 85° relative to the plane of said opening.

10. The assembly of claim 9 wherein said bulb socket means is located in the central portion of said first end wall.

11. The assembly of claim 9 wherein said bottom wall has first and second adjoining segments, said first segment adjoining said second end wall and said second segment adjoining said first end wall.

12. The assembly of claim 11 wherein said first segment is oriented at an acute angle relative to the plane of said opening.

13. The assembly of claim 12 wherein said second segment is oriented substantially parallel to the plane of said opening.

14. The assembly of claim 13 wherein the width and length of the bottom wall are about half the width and length, respectively, of said opening.

15. The assembly of claim 1 further comprising a translucent, diffusing lens disposed over said opening.

16. A reflector assembly for low level diffuse illumination comprising a housing defining a concavely shaped cavity, and socket means associated with said housing for positioning an incandescent bulb so that the filament of said bulb is located wholly within said cavity, said cavity having a matte finish, mirrored reflecting surface thereon oriented in a band across the inner, central portion of said cavity and so located as to dispose the filament of said bulb between said band and the opening from said cavity, the remainder of said cavity having a glossy white, semireflecting surface, said reflector assembly operting to diffusely and substantially uniformly illuminate a predetermined area spaced from said reflector assembly.

17. The assembly of claim 16 wherein said band comprises a strip of polymeric material having a matte finish, mirrored surface coating, said reflector assembly further including means for attaching said polymeric strip to said reflector housing.

18. The assembly of claim 17 wherein said cavity is defined by a pair of convergent side walls, a first end wall oriented generally upright relative to the plane of said opening, a second end wall located opposite said first end wall and being oriented at a generally acute angle relative to the plane of said opening, and at least one bottom wall adjoining said side and end walls, said socket means extending through and affixed to said first end wall, said strip being positioned at least on said bottom wall.

19. The assembly of claim 18 wherein said strip extends from a position adjacent said socket means and behind the filament of said bulb, along the bottom wall of said cavity, along said second end wall, and terminates adjacent the opening of said cavity.

20. The assembly of claim 19 wherein the width of said strip is less than half of the width of said cavity opening.

21. The assembly of claim 20 further comprising a translucent diffusing lens associated with said housing and disposed over the opening from said cavity.

* * * * *